United States Patent
Coronado et al.

(10) Patent No.: US 9,563,360 B2
(45) Date of Patent: Feb. 7, 2017

(54) MANAGEMENT OF EXTENT MIGRATION ON TIERED STORAGE

(71) Applicant: International Business Machines Corporation, Armonk, NY (US)

(72) Inventors: Juan A. Coronado, Tucson, AA (US); Yong Guo, Shanghai (CN); Beth A. Peterson, Tucson, AZ (US); Jie Tian, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/072,851

(22) Filed: Mar. 17, 2016

(65) Prior Publication Data

US 2016/0196068 A1     Jul. 7, 2016

Related U.S. Application Data

(63) Continuation of application No. 14/166,369, filed on Jan. 28, 2014, now Pat. No. 9,323,471.

(51) Int. Cl.
*G06F 12/00* (2006.01)
*G06F 3/06* (2006.01)

(52) U.S. Cl.
CPC .......... *G06F 3/0604* (2013.01); *G06F 3/0611* (2013.01); *G06F 3/0616* (2013.01); *G06F 3/0619* (2013.01); *G06F 3/0647* (2013.01); *G06F 3/0665* (2013.01); *G06F 3/0683* (2013.01); *G06F 3/0685* (2013.01); *G06F 3/0689* (2013.01); *G06F 3/0601* (2013.01)

(58) Field of Classification Search
None
See application file for complete search history.

(56) References Cited

U.S. PATENT DOCUMENTS

| | | |
|---|---|---|
| 2007/0226447 A1 | 9/2007 | Shimozono et al. |
| 2012/0047287 A1 | 2/2012 | Chiu et al. |
| 2012/0198107 A1 | 8/2012 | McKean et al. |
| 2013/0124780 A1 | 5/2013 | Baderdinni et al. |

OTHER PUBLICATIONS

Coronado et al., "Managenemt of Extent Migration on Tiered Storage", U.S. Appl. No. 14/166,369, filed Jan. 28, 2014.
Coronado et al., "Managenemt of Extent Migration on Tiered Storage", U.S. Appl. No. 15/072,815, filed Mar. 17, 2016.

*Primary Examiner* — Brian Peugh
(74) *Attorney, Agent, or Firm* — Stosch Sabo

(57) ABSTRACT

Aspects of the present disclosure are directed toward a computer program product for managing the migration of extents on tiered systems. The computer program product can be configured to receive a space reservation request for one or more requested extents on a first storage tier of a storage system. The computer program product can also be configured to release a first storage tier reserve space that includes one or more first tier reserved extents in response to the first storage tier reserve space being insufficient for the reservation request. The computer program product can also be configured to migrate the one or more requested extents to the first storage tier reserve space.

10 Claims, 8 Drawing Sheets

MANAGEMENT OF EXTENT MIGRATION ON TIERED STORAGE

BACKGROUND

The present disclosure relates to data storage systems, and more specifically, to migrating data within data storage systems.

A data storage system can have one or more storage tiers in one or more storage devices. Tiered storage is a data storage environment consisting of two or more kinds of storage delineated by differences in at least one of these four attributes: price, performance, capacity and function. Any significant difference in one or more of the four defining attributes can be sufficient to justify a separate storage tier.

Extents can be managed on tiered storage. An extent is a contiguous area of storage in a computer file system, reserved for a file. When a process creates a file, file-system management software allocates a whole extent. When writing to the file again, possibly after doing other write operations, the data continues where the previous write left off. This can reduce or eliminate file fragmentation and possibly file scattering too. An extent-based file system (i.e., one that addresses storage via extents rather than in single blocks) need not require limiting each file to a single, contiguous extent.

SUMMARY

Embodiments of the disclosure can include a computer program product for managing extent migration on tiered storage devices. The computer program product can include a computer readable storage medium having program instructions embodied therewith, where the computer readable storage medium is not a transitory signal per se. The program instructions can be executed by a processor to cause the processor to perform a method including receiving a space reservation request for one or more requested extents on a first storage tier of a storage system, where a second storage tier has a higher relative performance than the first storage tier, and where the storage system includes both the first storage tier and the second storage tier. The program instructions can cause the processor to perform a method further comprising releasing a first storage tier reserve space that includes one or more first tier reserved extents in response to the first storage tier reserve space being insufficient for the reservation request. The releasing can include prioritizing a plurality of first tier extents on the first storage tier, determining a space deficiency for the space reservation request in the first storage tier, and selecting one or more migrating extents on the first storage tier that are at least equal to the space deficiency, where the one or more migrating extents include a low priority extent. The releasing can also include migrating the one or more migrating extents to the second storage tier in response to the second storage tier having a second storage tier reserve space for the one or more migrating extents. The program instructions can cause the processor to perform a method further comprising migrating the one or more requested extents to the first storage tier reserve space, and migrating, in response to the space reservation request being sufficient for the first storage tier reserve space, the one or more requested extents to the first storage tier.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
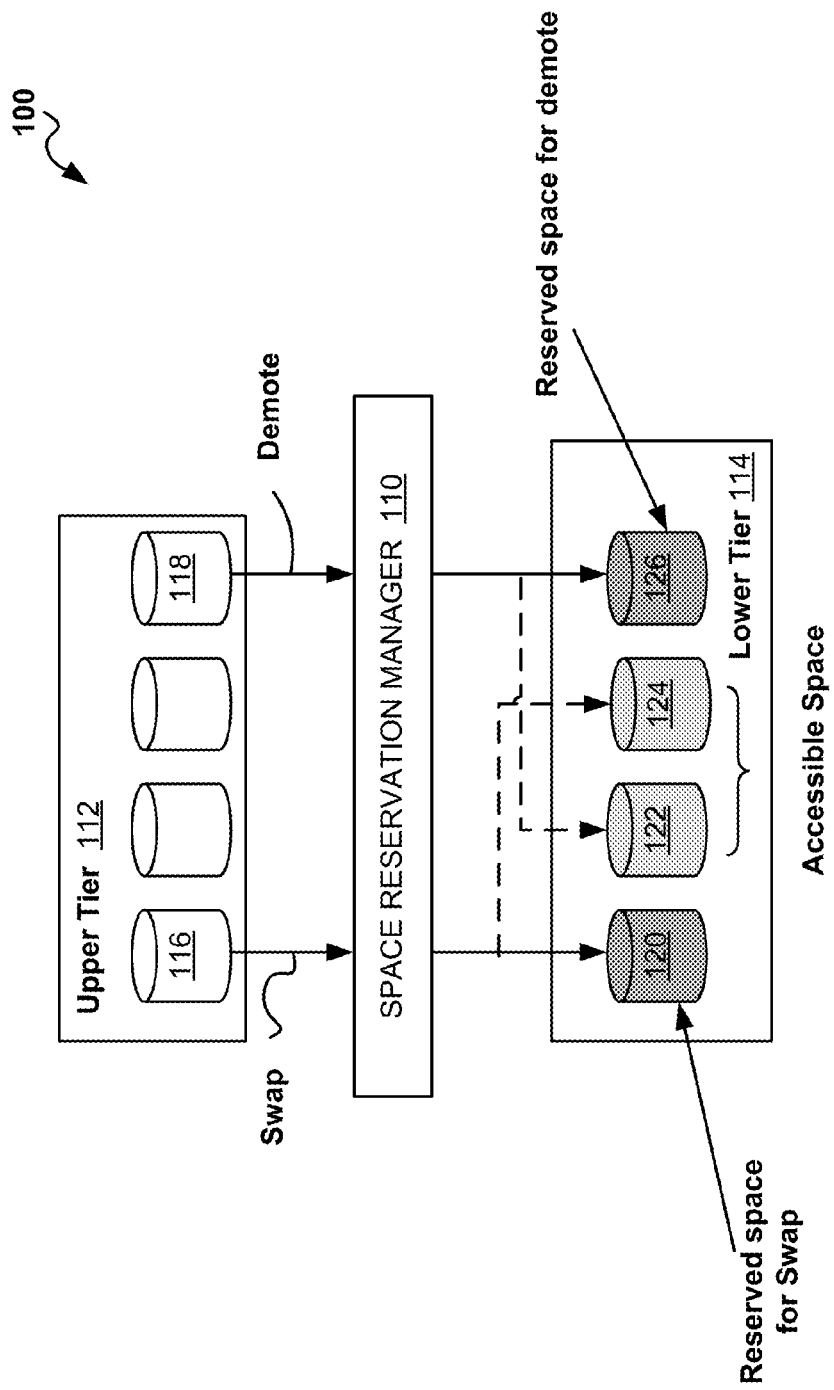
FIG. 1 illustrates a block diagram of a storage system that limits access for migrations across storage tiers, according to various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

DETAILED DESCRIPTION

Aspects of the present disclosure relate to management of extents on tiered storage, more particular aspects relate to a space reservation manager (SRM) that receives a request to migrate an extent to a target tier. If there is not any reserve space in the target tier, then the space reservation manager can release space in the target tier by migrating low priority, or cold extents away from the target tier (e.g., a higher or lower performance tier) to release reserve space on the target tier. While the present disclosure is not necessarily limited to such applications, various aspects of the disclosure may be appreciated through a discussion of various examples using this context. The term cold extent can be used to refer to a specific type of low priority extent and can be used interchangeably throughout this disclosure.

In tiered storage, the individual tiers in the storage system may be managed by a storage controller. The individual tier may have one or more ranks within the tier to assist in managing the extents within the tier. For example, extents assigned to a rank may be promoted and demoted based on extent performance.

Storage systems, such as IBM® Easy Tier®, can require that each component requests a space reservation for itself. The space reservation can be for an extent. A consistent mechanism or central service may exist. For example, in Easy Tier®, a component can record how many extents to reserve for each tier by storage pool. Then, Easy Tier® can poll the various components to see if there is available space. Easy Tier® can query an Easy Tier® Application's records and then trigger space reservation accordingly. Easy Tier® queries all other components.

In various embodiments, a target tier for the space reservation can be requested. If there is not any available or accessible space on the requested target tier, then the storage system can perform a number of actions. For example, the storage system can move related extents through WARM DEMOTE which moves hot extents from the target tier to a lower tier. However, a number of problems can develop when hot extents migrate to the lower tier, the hot extents may overload the lower storage tier. The overloading can lead to performance issues. Moreover, some current space-reserving policies may not support the downward migration of hot extents from the lowest tier in a pool, since there would be no lower tier than the lowest tier.

In various embodiments of the disclosure, an SRM can exist that migrates extents, such as cold extents, away from the target tier and to another tier, such as a higher tier, which can improve durability of the higher tier.

FIG. 1 illustrates a block diagram of a storage system 100 that limits access for migrations across storage tiers, according to various embodiments. The storage system 100 can have one or more storage devices. Each storage device can have one or more tiers and each tier can have one or more ranks. The storage tiers can have different performance levels. For example, one storage tier can have a higher relative performance than another storage tier which can be measured using performance metrics such as access times, or access frequencies.

The storage system 100 illustrates the reserved space for various extent management activities. The storage system 100 can utilize accessible space and reserved space. The accessible space is space made available for any storage activity while the reserved space can be made accessible for specific storage activities. The reserved space can also include free space within the storage system for the specific activity. For example, for an extent migration to a storage tier, the reserve space can be made accessible to the extent for the purposes of the migration. There may be more free space on the storage system, but not for the purposes of migration. The reserved space can also be a space available to an extent.

As shown, the storage system 100 can include a Space Reservation Manager (SRM) 110 to coordinate the migrations from an upper tier 112 and to a lower tier 114. For example, the space reservation manager 110 can receive an instruction from the upper tier 112 and transmit further instructions to the lower tier 114. The SRM 110 can be a set of instructions or a module on a storage controller for multiple drives.

The upper tier 112 can have one or more extents, e.g., extent 116, and extent 118. In various embodiments, the upper tier 112 can be a fast access storage device, or high performance drive, such as a Solid State Drive (SSD) or a faster access drive compared to the lower tier 114. The upper tier 112 can request to demote the extent 118, or swap the extent 116. Other extent management actions are contemplated including promote, or a cascading migration. The request can be made to the SRM 110.

In various embodiments, the SRM 110 can receive the request to demote extent 118 from the upper tier 112. The SRM 110 will search for reserve space on the lower tier 114 that is sufficient to store the extent 118. For the demote operation of extent 118. The SRM may only be allowed read access or visibility to certain extents. In various embodiments, the SRM can be allowed read access for certain blocks on a storage device.

The lower tier 114 can have the extents 120, 122, 124, and 126. Extents 122 and 124 can be visible to the SRM 110 in all circumstances. Extents 120 and 126 can be considered reserve space depending on the function. For example, the SRM 110 can view extent 126, but not extent 120, as available for the extent 118 demotion. Assuming that all extents in the system 100 are of equal size, the SRM 110 can prioritize extent 122 over extent 126. If the extents are of unequal size, and extent 118 is larger than extent 122, then the SRM 110 can migrate extent 118 to both extent 122 and extent 126. If an extent is not available due to the extent being used, then the extent may be invisible or unavailable to the SRM 110.

In various embodiments, a swap operation can occur. The swap operation can reserve space on a lower tier so that a swap between two extents can occur without being stuck. A swap operation can replace an extent from the upper tier, e.g., extent 116, with an extent from the lower tier 114. The swap operation can create free space on a tier that may not have been originally available. For example, the migration of the extent 116 to the lower tier 114 and the corresponding migration of another extent from the lower tier 114 to the upper tier 112, can free up space on the lower tier 114 if the extent from the lower tier 114 is smaller than the extent 116. Furthermore, the swap operation can allow a cold extent from the upper tier 112 to migrate to the lower tier even though there is not the necessary accessible space in the lower tier 114. In various embodiments, the SRM 110 can identify the extent 120 to swap with extent 116. The extent 116 can be first moved to the lower tier 114 into the accessible extent 124. Then, the extent 120 can be migrated to the upper tier 112.

Figure 2:
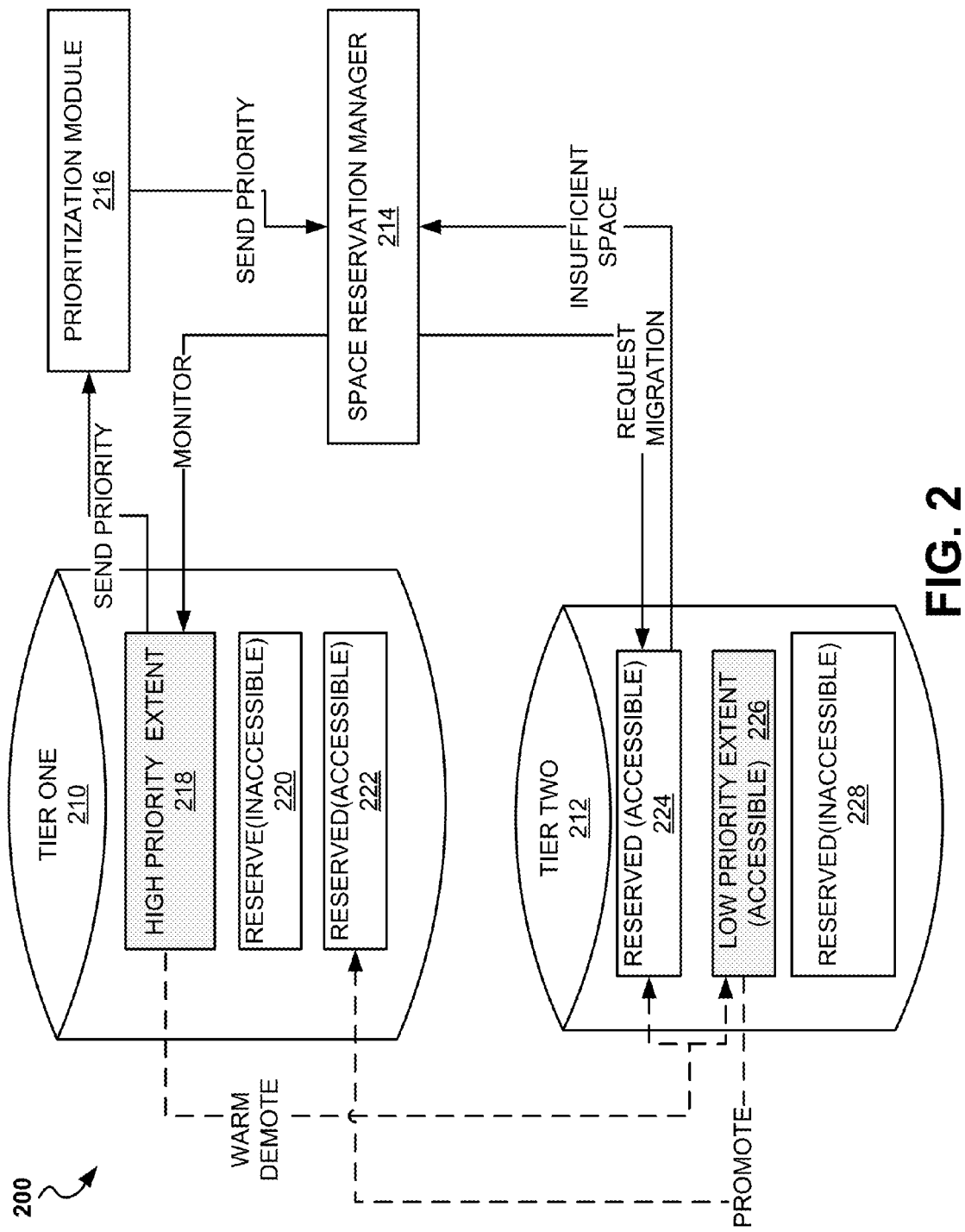
FIG. 2 illustrates a block diagram of a storage system that manages extents having different priorities, according to various embodiments.

FIG. 2 illustrates a block diagram of a storage system 200 that manages extents having different priorities, according to various embodiments. The storage system 200 can have a space reservation manager 214 that includes a prioritization module 216. The SRM 214 can be refer to the SRM used throughout this application. The space reservation manager 214 can manage a space reservation request from multiple tiers, e.g., tier one 210 and tier two 212. Although two tiers are shown in the storage system, more than two storage tiers in a storage system 200 are contemplated. The tiers in the storage system can originate from a single drive or partition. In various embodiments, the tiers can be referred to as storage tiers and can also refer to different ranks within a particular tier.

According to various embodiments, the space reservation manager 214 can monitor tier one 210 for an extent with an appropriate priority. Tier one 210, as illustrated, contains three areas: a space with a high priority extent 218, a reserve space 220 that is inaccessible to the SRM 214, and a reserve space 222 that is accessible to the SRM 214. The high priority extent 218 can have the appropriate priority to migrate to a lower tier. For example, the high priority extent 218 can be a hot extent, i.e., a frequently accessed extent, that degrades the performance, e.g., access times, of tier one 210. The prioritization module 216 can assign a high priority to the extent for migration to a lower tier, e.g. tier two 212, which can reduce the hotness on the higher tier.

Tier two 212, as illustrated, can have three areas: a reserved area 224 that is accessible to the SRM 214, an area containing a low priority extent 226, and a reserved extent 228 not accessible to the SRM 214. The SRM 214 can receive a request a migration for the high priority extent to tier two 212. If the reserved space 224 does not have sufficient space to accommodate the high priority extent 218, then the SRM 214 can decide to swap the low priority extent 226 of tier two 212 for the high priority extent 218 of tier one 210. The SRM 214 can promote the low priority extent 226 to the reserved space 222. Once promoted into the reserve space 222, the high priority extent can be warm demoted into the space formerly occupied by the low priority extent 226 and the reserve space 224.

The warm demote can be an operation whereby a hot extent is demoted into a lower tier to improve the performance of the higher tier. In various embodiments, the high priority extent 218 can be demoted into the reserve space 224 and then the low priority extent 226 can be promoted into the reserved space 222.

Figure 3:
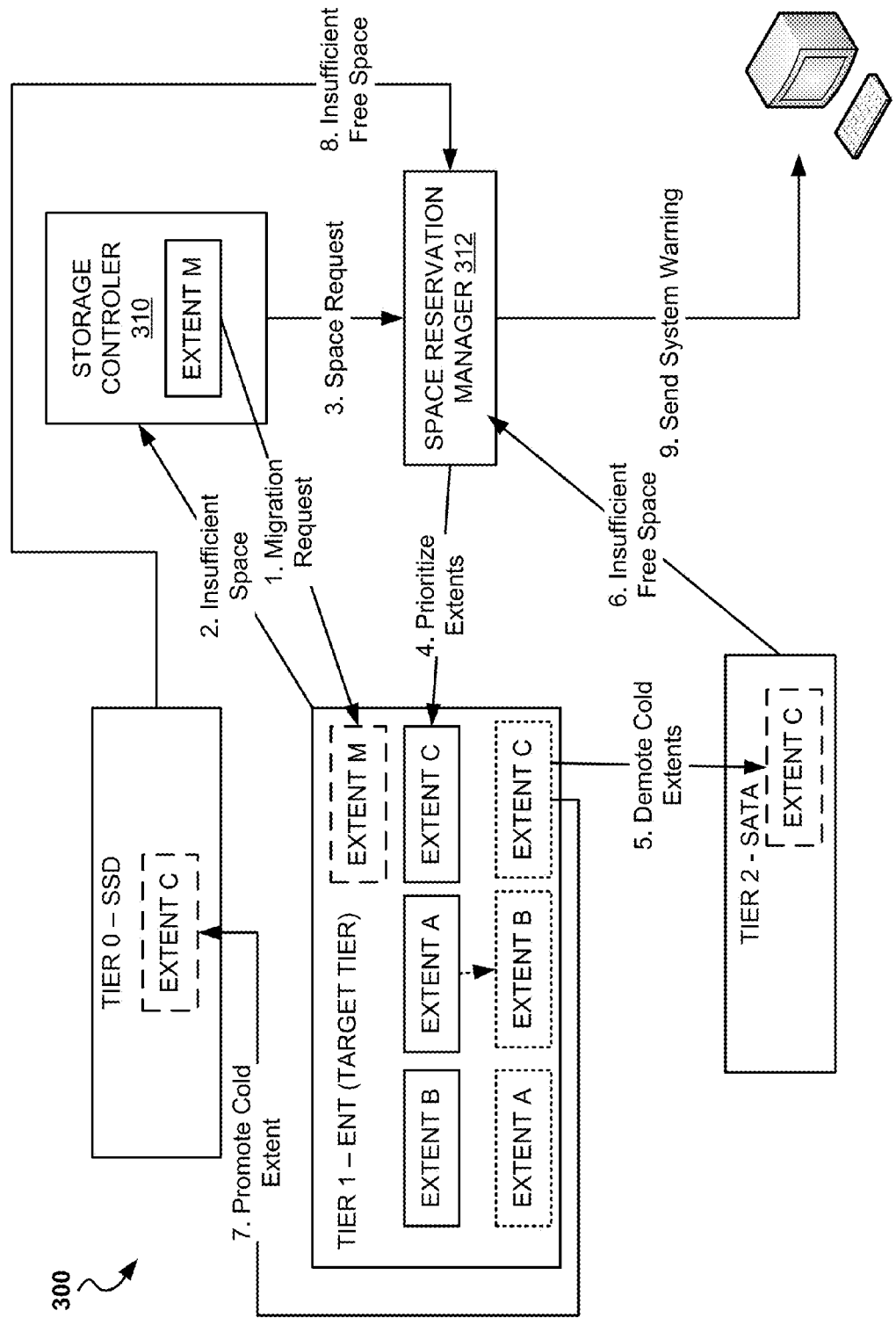
FIG. 3 illustrates a block diagram of a migration in a storage system with three tiers, according to various embodiments.

FIG. 3 illustrates a block diagram of a migration in a storage system 300 with three tiers, according to various embodiments. Although numbers are used to show a particular order in the storage system 300, the various operations may be conducted in any order. The storage system 300 can have three tiers: tier 0, tier 1, and tier 2. The tiers can be arranged by performance. For example, tier 0 can have the fastest relative access time such as a solid state disk (SSD), tier 1 can be an enterprise (ENT) drive, and tier 2 can have the slowest relative access times such as a serial advanced technology attachment (SATA) drive. In various embodiments, the tiers can refer to ranks within a tier or tiers on the same drive.

The storage system 300 can have a storage controller 310. The storage controller 310 can include a space reservation manager 312 and a prioritization module. In various embodiments, the SRM 312 can be separate from the storage controller 310. The SRM 312 can identify an extent M for migration to tier 1. Extent M can come from various tiers in the storage system including other tiers not pictured. In various embodiments, extent M can be selected from a higher tier similar to the storage system 200 in FIG. 2. Extent M can also come from an external source to be copied onto the storage system 300.

Tier 1, i.e., the target tier, can have one or more extents, e.g., extent A, extent B, extent C. The storage controller 310 can send a migration request to tier 1 for extent M. If there is insufficient space to accommodate extent M, the storage controller 310 can request to the space reservation manager 312 for more space.

The space reservation manager 312 can prioritize the extents existing in tier 1, e.g., extent A, extent B, and extent C. To release space, the SRM 312 can demote the cold or low priority extents into tier 2. If there is insufficient reserve space, then the SRM 312 can attempt to promote the cold extent, i.e. extent C, to the tier 0. If there is insufficient space on tier 0, the space reservation manager 312 can send a warning to the storage system 300. The warning can be a visual or auditory alert to the storage system 300 or a user that the migration is not possible.

Figure 4:
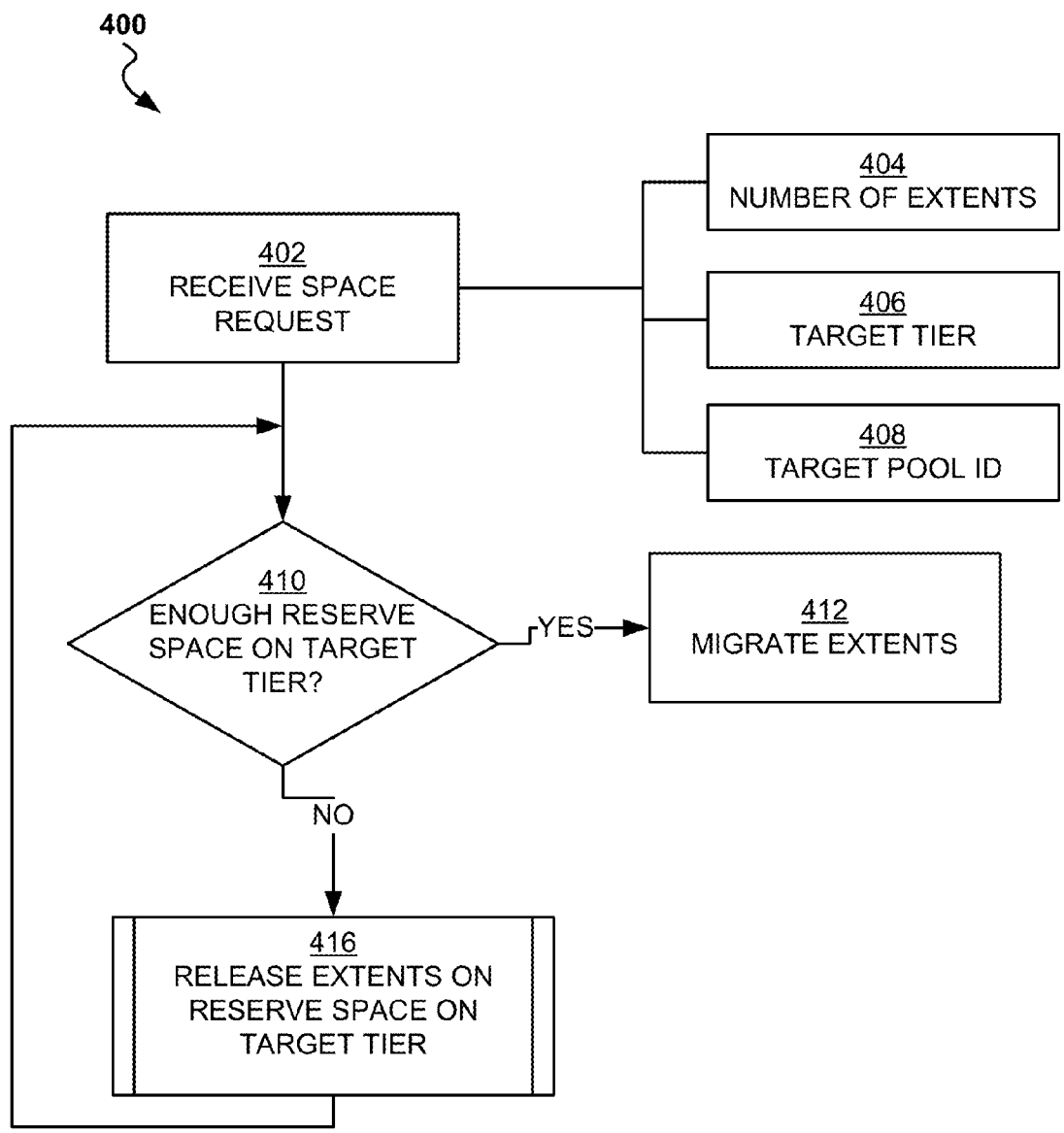
FIG. 4 illustrates a flowchart of a method of migrating extents to release reserve space on a storage system, according to various embodiments.

FIG. 4 illustrates a flowchart of a method 400 of migrating extents to release reserve space on a storage system, according to various embodiments. The method 400 can be performed by the space reservation manager and a particular storage tier. The storage system can request to the SRM to migrate an extent. The extent may be migrated from anywhere in the storage system to the target storage tier. The SRM can further manage the migration of extents away from the target storage tier to release reserve space for the extent. To accomplish this, the method 400 can begin at operation 402.

In operation 402, the receiving a space reservation request by the SRM can occur. The space reservation request is a request for an extent to be migrated to a particular storage tier within the domain of the SRM. The extent requested in operation 402 can also be referred to as a requested extent. In various embodiments, the space reservation request can originate from a storage controller or another storage tier. The space reservation request to the SRM can also include files that are currently being written to the storage system from an external source, e.g., a separate disk drive or a network. The space reservation request can be for a particular reserve space which can be managed by the space SRM, according to various embodiments. In various embodiments, the space reserve request can affect extents that originate from one storage tier and migrate to another storage tier.

The space reservation request can include information such as the number of extents 404 requested, the target tier of the request 406, and the target pool ID 408 of the request. For example, a space reservation request can take the form: "tier_id=1, reserve_cnt=n (n>=1), pool_id=x."

The space reservation request identifies a number of extents requested. The number of extents 404 can identify one or more extents requested from the requested target tier 406. According to various embodiments, the number of extents 404 can represent a requested extent count of one or more extents that are requested from the target tier, e.g., requested extents. The requested extent count can be a count of all space reservation requests sent to a target tier within a specific time period, e.g., 5 minutes. Extents part of the space reservation request can be of the same of different sizes. If the extent size varies in the storage system, then the space reservation request can include information that indicates the extent size. For example, the space reservation request can include the number of extents 64 kb=20, the number of extents 128 kb=2.

The requested target tier 406 can be requested based on policies set forth by the storage system. For example, if the storage system needs to reduce device degradation on a faster access time tier, then the storage system can request to migrate a hot extent, i.e., a frequently accessed extent, to a slower access time tier. As another example, the storage system can select a cold extent, i.e., an infrequently accessed extent, to be migrated to a slower access time tier to improve the access time of the faster access time tier.

The target pool identification (ID) 408 can refer to the target extent pool of the number of extents 404. An extent pool is a logical construct that is used to manage a set of extents of the same type that are associated with a given rank group. When an extent pool is defined, it can be assigned a rank group and an extent type. One or more ranks with the same extent type can be assigned to an extent pool, but a rank can be assigned to only one extent pool. There can be as many extent pools as there are ranks. There are no constraints on the number or size of ranks assigned to the extent pool. The extents of the ranks assigned to an extent pool are independently available for allocation to logical volumes that are associated with the extent pool. In various embodiments, each extent from a plurality of extents requested 404 can request different target extent pools. The plurality of extents requested 404 in the space reservation request can also be requested to a single target extent pool ID 408. For example, the space reservation request from a requester can inform the space reservation manager that the requester needs to reserve five free extents on tier 1 of Pool 2. The space reservation manager can add the count of five into the extent count, e.g., 404, for tier 1 of pool 2. The space reservation request can represent a number of extents or a free value for size, according to various embodiments. Once the space reservation request is received, then the method 400 can continue to operation 410.

In operation 410, the SRM can determine if there is sufficient reserve space on the target tier to accommodate the migration. Although the term reserve space is used, the reserve space can be used interchangeably with available space and accessible space throughout this disclosure. In various embodiments, the storage controller can determine if there is sufficient reserve space to accommodate the migration to the reserve space on the target tier. For example, if the space reservation request is larger than the reserve space on the target tier, then the reserve space on the target tier can be considered sufficient. The SRM can use the number of extents or a file size requirement for the migration.

A requested extent can be an extent that is requested to be used by the SRM. The requested extent can be on the target tier. An available extent can be an extent that is available to the requested extent for migration. The term sufficient reserve space can refer to the comparison of the count of the requested extents from the space request to a reserved extent count of one or more reserved extents from the reserved space on the target tier. If there is sufficient reserve space, then the method 400 can continue to operation 412. In operation 412, the extents are migrated to the reserve space on the target tier or target storage tier.

If there is not sufficient reserve space, then the SRM can determine that there is an insufficient reserve space on the target tier. An insufficient amount of reserve space can be determined based on a count. For example, if the count of reserved extents on the target storage tier is less than the count for requested extents, then there would be an insufficient amount of reserve space. In various embodiments, the size of the extents may not be even. In this circumstance, an insufficient amount of reserve space can be determined by file size. For example, if there are 2 68 kb requested extents and 1 128 kb request extent, and the reserve space has enough space for 3 68 kb extents, i.e., 204 kb, then the SRM can determine that there is insufficient reserve space. If there is not sufficient reserve space on the target tier, then the method 400 can continue to operation 416.

In operation 416, the SRM can release reserve space on the target tier. In various embodiments, the release of reserve space can be accomplished by migrating cold or low priority extents away from the target tier to accommodate the space request. The migrating cold or low priority extents can be referred to as migrating extents. The reserve space can be released by migrating low priority extents to either a higher tier than the target tier or a lower tier than the target tier. More reserve space can be created by the migration of low priority extents away from the target tier. The SRM can fill the reserve space released to the SRM with the requested extents from the space migration request. In various embodiments, the SRM can release a certain number or a count of reserve spaces by migrating the number of extents away A determination of whether to first migrate the low priority extent on the target tier to the higher tier or the lower tier can occur depending on system policy. For example, if the system policy prefers higher performance over device stability, then the SRM can attempt to migrate the low priority extent to the lower tier before the SRM migrates the low priority extent to the higher tier. In another example, the system policy can prefer device stability and first attempt to migrate the low priority tier to the higher tier. In various embodiments, the SRM can release more reserve space than the space reservation request. The degree to which more reserve space is released can depend upon the system policy.

In various embodiments, the target tier can be referred to as a first storage tier, and the lower or higher tier can be referred to as a second storage tier, depending on the system policy. The third storage tier can refer to destinations that extents on the second storage tier migrate, if applicable. Throughout this disclosure, tier and storage tier may be used interchangeably.

In various embodiments, the requested extents can originate from the second storage tier to exchange with migrating extents on the first storage tier. If the first storage tier has a higher performance than the second storage tier, then the requested extents could require fewer storage resources than the migrating extents. The fewer storage resources can refer to the requested extent being a colder extent than the migrating extent, which could allow the first storage tier to be "cooled" by the colder requested extent. Thus, the storage resource can refer to an access resource. The storage resource can also refer to a storage capacity of the extent on a storage device, according to various embodiments.

Figure 5:
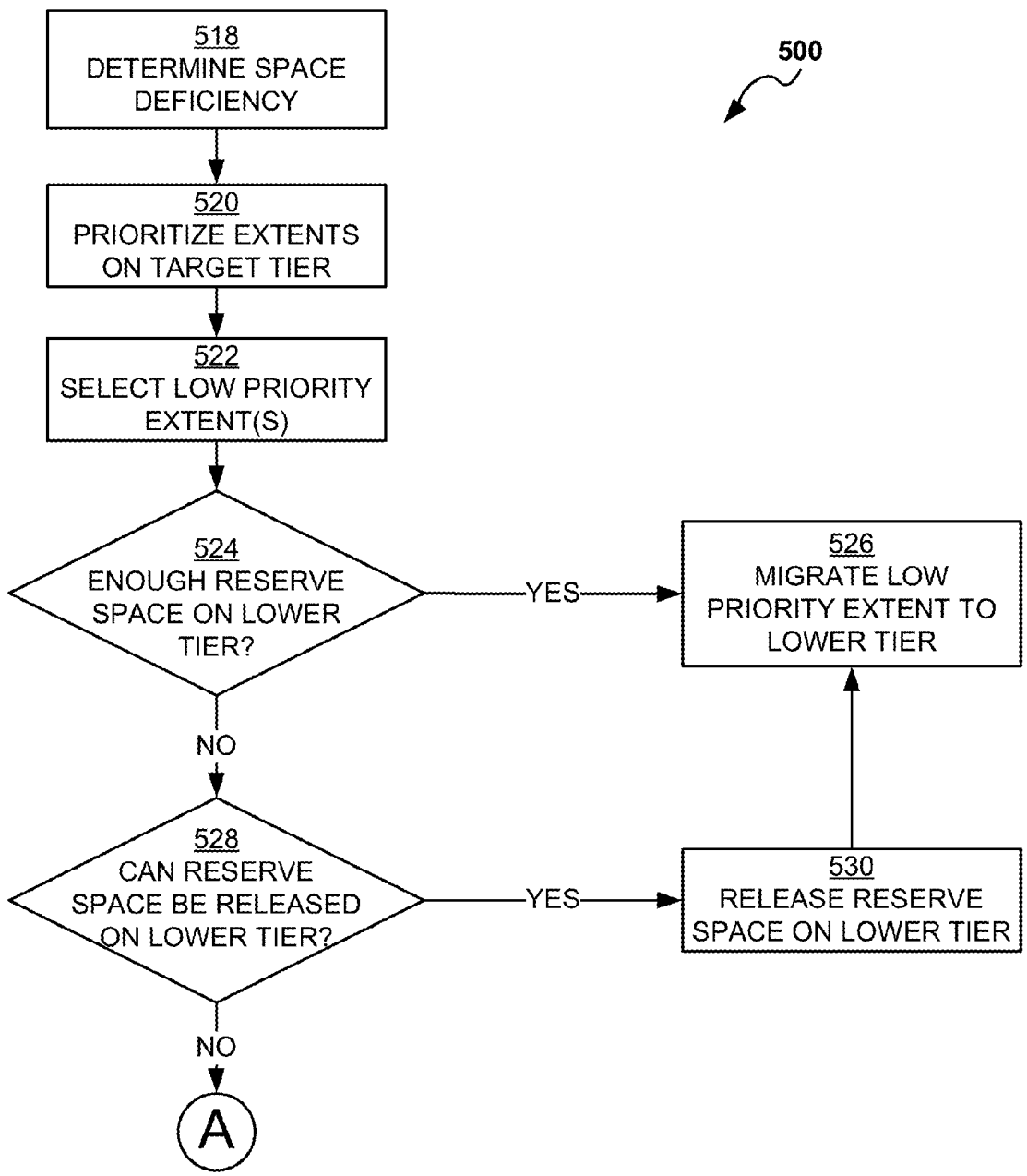
FIG. 5 illustrates a flow chart of a method to release reserve space on a target tier, according to various embodiments.

FIG. 5 illustrates a flow chart of a method 500 to release reserve space on a target tier, according to various embodiments. The method 500 can correspond to operation 416 of FIG. 4. The method 500 can be performed by the space reservation manager. The method 500 can begin at operation 518.

In operation 518, the SRM can determine the amount of deficient space, or space deficiency, on the target tier. The space deficiency can be an amount of reserve space required on the space reserve request beyond the reserve space availability of the target tier. In various embodiments, the SRM can determine the amount of reserve space by which the target tier is deficient. For example, if 500 megabytes (MB) of reserve space is requested in the space migration request, but the target tier only has 300 MB of reserve space, then the target tier is the difference between the space migration request and the reserve space, and thus has a space deficiency of 200 MB. The SRM can find a solution that enables the target tier to release 200 MB of reserve space.

In various embodiments, the space deficiency can be determined by a count of extents. The count can be derived from the number of extents on the storage tier. For example, if there are 300 available extents on a storage tier and there are 400 requested extents for the storage tier, then the space deficiency can be 100 extents. Therefore, the SRM would need to release 100 extents worth of data. In various embodiments, the extents are the same data size or size. The extents can also be of different sizes. Once the space deficiency on the target tier is determined, then the method 500 can continue to operation 520.

In operation 520, the prioritization manager can prioritize the extents on the target tier. In various embodiments, the prioritizing the extents can be based on a storage system policy. The storage system policy can take steps to determine to prioritize performance, capacity, security, durability, or other factors. For example, if the extents are prioritized based on performance, then the most frequently accessed extents will have the highest priority since a movement of a frequently accessed extent between tiers will have more of an impact on the performance. The extents can also be prioritized based on the data content. For example, secure data such as financial records may have a high priority for movement to tiers with encryption. In various embodiments, the extents can be ranked relative to each other in order of priority. Further examples of prioritization are described herein. After the extents are prioritized, then the method 500 can continue to operation 522.

In operation 522, the SRM can select the low priority extent from the prioritized list of extents determined from operation 520. The low priority extent may be the lowest ranked extent or the low priority extent may be of a lower priority than the highest priority extent. In various embodiments, the low priority extent can be determined by a threshold. For example, the low priority extent may have a performance threshold that does not allow the low priority extent to be selected unless the low priority extent has an access time below a certain threshold value.

In various embodiments, the SRM can also determine whether the low priority extent migration will produce enough reserve space on the target tier. For example, the low priority extent may be smaller than the space deficiency. Therefore, if the low priority extent is 150 MB but the deficiency on the target tier is 200 MB, then an insufficient amount of reserve space will be released by the migration of the low priority tier. The SRM can also select more than one low priority extent to release the reserve space necessary on the target tier, including if the total space required of the low priority extents is larger than the space deficiency in the target tier. After the low priority extent is selected, then the method 500 can continue to operation 524.

In operation 524, the SRM can determine whether a tier lower than the target tier, i.e., the lower tier is able to release the determined amount of the space deficiency for the low priority tier. For example, if the target tier is deficient by 200 MB, and the low priority extent is 200 MB, then the SRM can determine if the tier lower than the target tier, i.e., the lower tier, has 200 MB. If the lower tier has reserve space on the lower tier greater to or equal to the space deficiency, then the method 500 can continue to operation 526. If the lower tier does not have enough determined reserve space on the lower tier, or the lower tier does not exist, e.g., because the target tier is the lowest tier, then the method 500 can continue to operation 528.

In operation 526, the low priority extent from the target tier can be migrated from the target tier to the lower tier. The migration can make reserve space accessible on the target tier for the space request in FIG. 4.

In operation 528, the SRM can determine whether reserve space can be released on the lower tier sufficient for the target tier low priority tier. Reserve space can be released if one or more extents on the lower tier can be migrated to a different tier. In various embodiments, the SRM can predict whether space can be released using simulated data. For example, if 200 MB is needed on the lower tier, and the lower tier can migrate an extent to a first tier to free 200 MB, then reserve space can be released. It can also be possible for the operation to occur in a cascading fashion if not enough reserve space exists on the first tier. For example, if the first tier does not have 200 MB reserve space, then the first tier can migrate first tier extents to another tier to release the space. If the SRM is able to release the reserve space on the lower tier, then the method 500 can continue to operation 530. If SRM is not able to release reserve space on the lower tier, then the method 500 can continue to reference A.

In operation 530, the SRM can release reserve space on the lower tier in order to accept a migration from the target tier. The SRM can execute the simulation paths determined in operation 528. In various embodiments, the release of reserve space can involve a swap. A swap could migrate a low priority extent from the lower tier to the target tier and migrate a high priority extent from the target tier to the lower tier. A swap could generate more reserve space on the target tier if the low priority extent is smaller than the high priority extent migrated. The swap can require a buffer area for the lower tier to accept the high priority extent. After the reserve space is released on the lower tier, the method 500 can continue to operation 526 where the low priority extent from the target tier is migrated to the lower tier.

Figure 6:
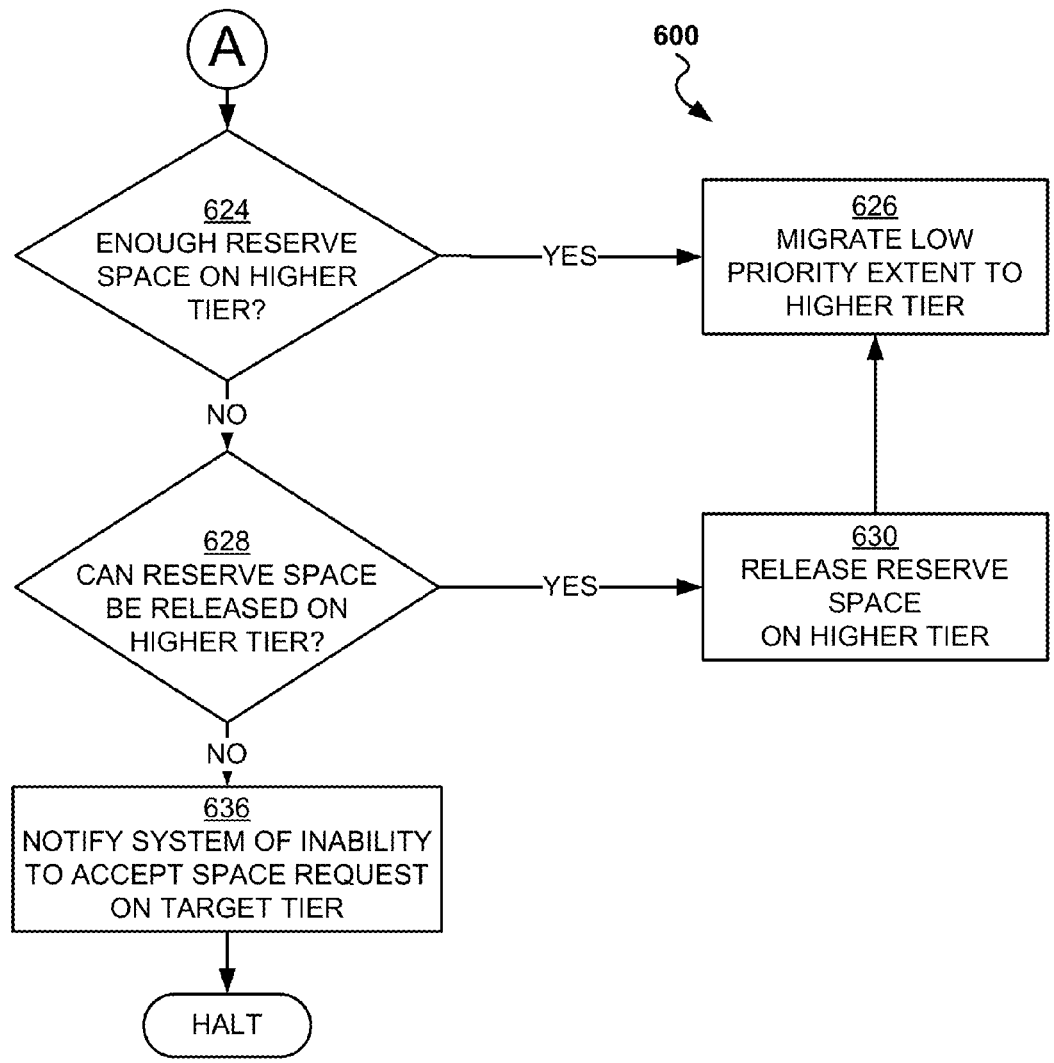
FIG. 6 illustrates a flowchart of a method of migrating a low priority extent to a higher-level tier than the target tier, according to various embodiments.

FIG. 6 illustrates a flowchart of a method 600 of migrating a low priority extent to a higher-level tier than the target tier, according to various embodiments. The method 600 can continue from reference A on FIG. 5 or stand independent. Certain operations of the method 600 can be similar in operation to method 500 in FIG. 5. For example, operation 628 can be similar to the analysis used for operation 528 in FIG. 5. The method 600 can correspond to a portion of operation 416 from FIG. 4. In various embodiments, aspects of method 600 can occur before aspects used in FIG. 5. For example, the method 600 can be inserted between operation 522 and 524 of FIG. 5. The method 600 can begin at operation 624.

In operation 624, the SRM can determine if the deficient amount of reserve space, or space deficiency, from the target tier exists on the tier with a higher priority than the target tier, e.g., the higher tier. The higher tier can be marked by a shorter access time such as an SSD. In various embodiments, the target tier may not have a higher tier or there is not enough reserve space on the higher tier and the method 600 can continue to operation 628. If the higher tier contains enough capacity to accommodate the low priority extent from the target tier, then the method 600 can continue to operation 626.

In operation 626, the SRM can migrate the low priority extent from the target tier to the higher tier. By this migration, the SRM can also reduce a load on the higher tier by inserting a lower priority extent, or cold extent. In operation 628, the SRM can determine if reserve space can be released on the higher tier by migrating one or more extents away from the higher tier to a different tier. If reserve space cannot be released on the higher tier, then the method 600 can continue to operation 636. If reserve space can be released on the higher tier, then the SRM can release the reserve space on the higher tier in operation 630. After the reserve space is released on the higher tier, then the method 600 can continue to operation 626.

In operation 636, the SRM can notify the storage system of the inability to accept the space request. It may be possible for the target tier to not be able to release reserve space by migrating a low priority extent to a higher or lower tier. If this occurs, then the storage system cannot accept the space request, e.g., operation 402 in FIG. 4. The SRM can also notify the storage system such as a visual communication or a pop up window to indicate that the migration is not possible. After the notification in operation 636, the method 600 may halt.

Figure 7:
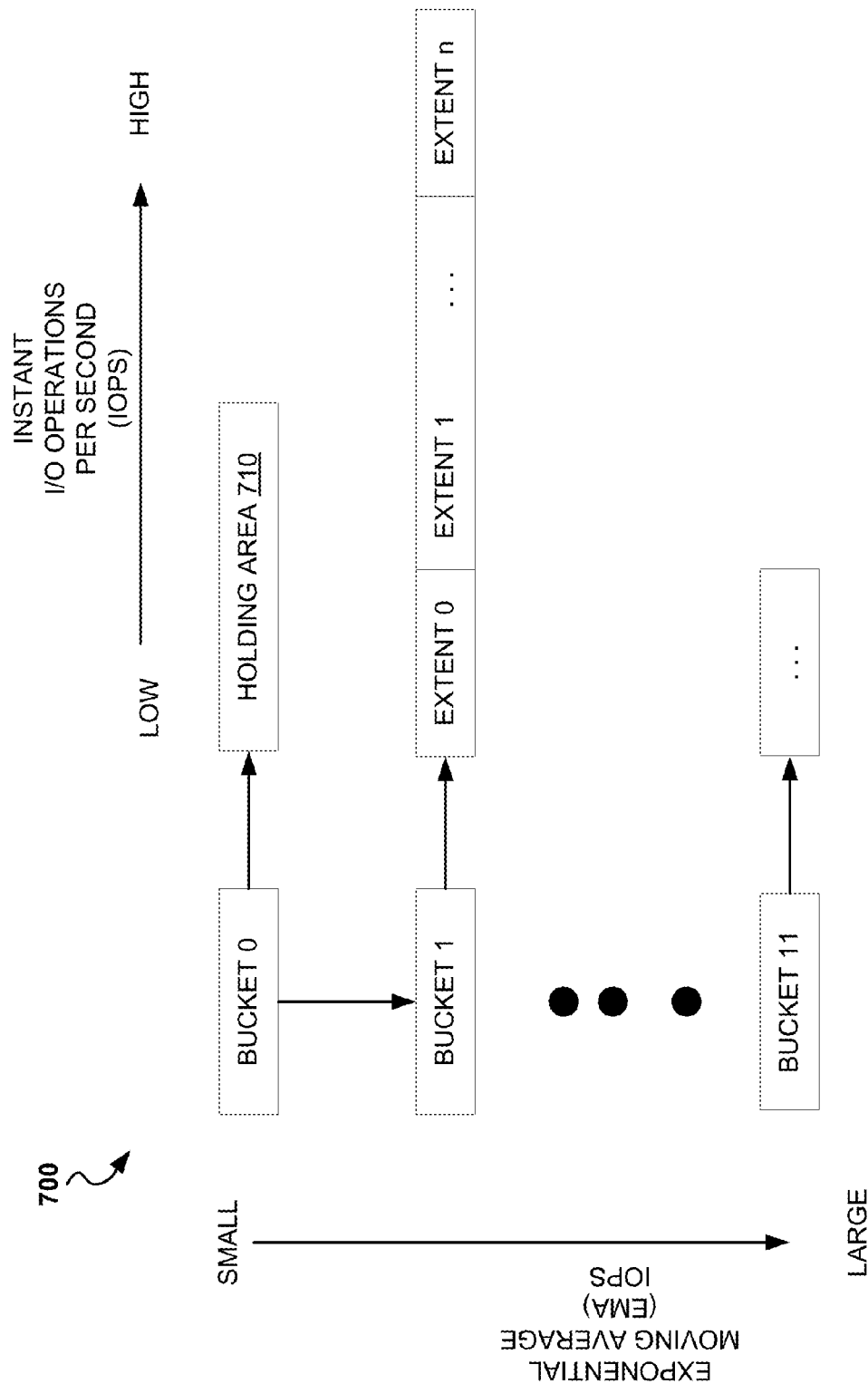
FIG. 7 illustrates a block diagram of a prioritization system that can be used in the prioritization module, according to various embodiments.

FIG. 7 illustrates a block diagram of a prioritization system 700 that can be used in the prioritization module, according to various embodiments. The prioritization system 700 can be for prioritizing a plurality of extents within the same rank. For example, in a 2-tier pool, Tier 0 and Tier 1, Tier 0 may have one SSD rank and Tier 1 may have three ENT ranks, e.g., ENT rank A, ENT rank B, and ENT rank C. If the SRM needs to release reserve space in Tier 1, then the SRM may need to select a particular rank within Tier 1. The selection of the rank within Tier 1 can occur randomly, in various embodiments. For example, the prioritization system 700 can select ENT rank B randomly.

Once selected, the prioritization system 700 can further divide the ENT rank A into twelve "buckets" or containers. Although 12 buckets are shown, i.e., bucket 0 through bucket 11, more or fewer buckets are contemplated.

The prioritization system 700 can create the buckets according to a measurement of the extent's respective Exponential Moving Average (EMA) I/O operations per second (IOPS). The EMA is an average value based on long-term performance statistics. The measurement can occur using a variety of techniques. For each rank candidate of Space Reservation, its extents are divided into different buckets. Extents in bucket 11 can have the largest TOPS, and those in bucket 1 can have the smallest TOPS. Bucket 0 can include a buffer for extents which have just been moved and should stay there for a minimum time range.

In each of the buckets, e.g., bucket 1, the extents are sorted according to the ascending order of instant TOPS. The instant TOPS differs from the EMA IOPS in that the instant TOPS refers to a real-time value. The prioritization module can select the coldest extent from bucket 1 until bucket 11, e.g., extent 0 until no more extents are required in the prioritization module. The coldest extent can mean that the extent has the smallest instant TOPS.

Figure 8:
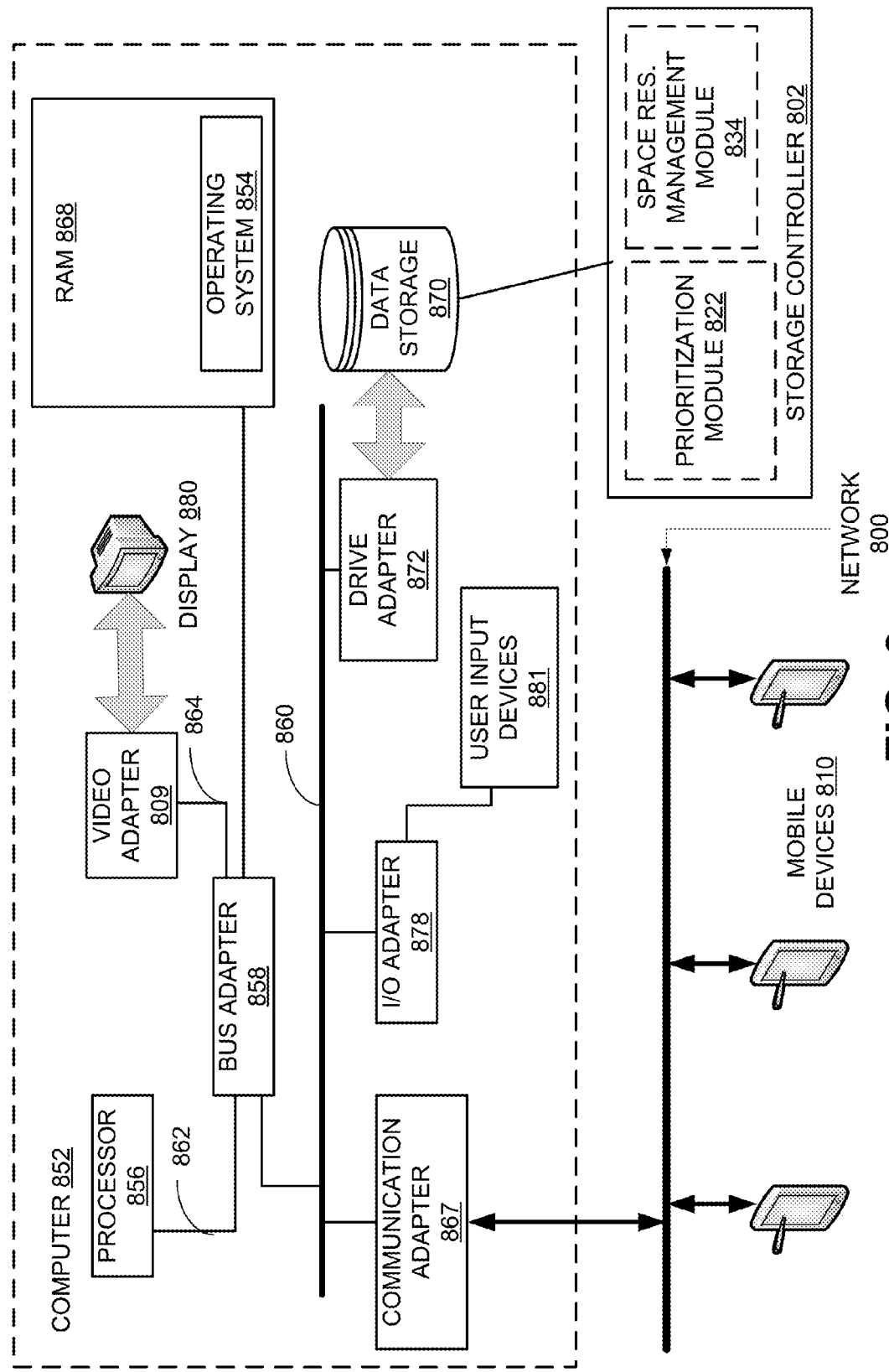
FIG. 8 depicts a block diagram of automated computing machinery, according to an embodiment.

FIG. 8 depicts a block diagram of automated computing machinery, according to an embodiment. The computing machinery can include example computer 852 useful in performing aspects of the disclosure, according to various embodiments. The computer 852 of FIG. 8 includes at least one computer processor 856 or 'CPU' as well as random access memory 868 ('RAM') which is connected through bus adapter 858 to processor 856 and to other components of the computer 852.

Also stored in RAM 868 is an operating system 854. Operating systems useful for record filtering according to embodiments of the present invention include UNIX®, Linux®, Microsoft XP™, AIX®, IBM's i5/OS™, and others. The operating system 854 and simulator 801 are shown in RAM (868), but many components of such software typically are stored in non-volatile memory also, such as, for example, on a disk drive 870.

The computer 852 can also include disk drive adapter 872 coupled through expansion bus 860 and bus adapter 858 to processor 856 and other components of the computer 852. Disk drive adapter 872 connects non-volatile data storage to the computer 852 in the form of disk drive 870. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The disk drive 870 can have a storage controller 802. The storage controller 802 for the disk drive 870 can have a prioritization module 822 and a space reservation manager module 834. The prioritization module 822 can prioritize the extents on a tier in the disk drive 870. The prioritization module 822 can communicate the priority to the SRM module 834. The storage controller 802 can also have an SRM module 834 which can migrate the extents within the disk drive 870.

The example computer 852 includes one or more input/output ('I/O') adapters 878. I/O adapters implement user-oriented input/output through, for example, software drivers and computer hardware for controlling output to display devices such as computer display screens, as well as user input from user input devices 881 such as keyboards and mice. The example computer 852 includes a video adapter 809, which is an example of an I/O adapter specially designed for graphic output to a display device 880 such as a display screen or computer monitor. Video adapter 809 is connected to processor 856 through a high speed video bus 864, bus adapter 858, and the front side bus 862, which is also a high speed bus.

The example computer 852 includes a communications adapter 867 for data communications with other computers 810, e.g., mobile devices, and for data communications with a data communications network 800. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer readable storage medium having program instructions embodied therewith, wherein the computer readable storage medium is not a transitory signal per se, the program instructions executable by a processor to cause the processor to perform a method comprising:
    receiving a space reservation request for one or more requested extents on a first storage tier of a storage system, wherein a second storage tier has a higher relative performance than the first storage tier, and wherein the storage system includes both the first storage tier and the second storage tier;
    releasing a first storage tier reserve space that includes one or more first tier reserved extents in response to the first storage tier reserve space being insufficient for the reservation request by:
        prioritizing a plurality of first tier extents on the first storage tier;
        determining a space deficiency for the space reservation request in the first storage tier;
        selecting one or more migrating extents on the first storage tier that are at least equal to the space deficiency, the one or more migrating extents include a low priority extent; and
        migrating the one or more migrating extents to the second storage tier in response to the second storage tier having a second storage tier reserve space for the one or more migrating extents;
    migrating the one or more requested extents to the first storage tier reserve space; and
    migrating, in response to the space reservation request being sufficient for the first storage tier reserve space, the one or more requested extents to the first storage tier.

2. The computer program product of claim 1, wherein the receiving the space reservation request includes:

receiving a target storage tier that identifies the first storage tier, a requested extent count derived from the one or more requested extents on the first storage tier, and a pool identification for the first storage tier.

3. The computer program product of claim 2, wherein determining the space deficiency includes determining a difference between a requested extent count from the one or more requested extents and a first tier reserved extent count from the one or more first tier reserved extents.

4. The computer program product of claim 1, wherein prioritizing the plurality of extents on the first storage tier includes:
   selecting a rank from a plurality of ranks within the first storage tier;
   measuring, for the rank, an Exponential Moving Average (EMA) I/O Operations per Second (IOPS) for a plurality of containers;
   prioritizing the plurality of containers by the EMA TOPS;
   prioritizing the plurality of extents within a container based on a measurement of an TOPS for an extent; and
   selecting the low priority extent within a container from the plurality of containers.

5. The computer program product of claim 4, wherein selecting the rank from the plurality of ranks occurs randomly.

6. The computer program product of claim 4, wherein the lowest priority extent is defined by a low TOPS relative to other extents within the container and the container having a low EMA TOPS relative with another container from the plurality of containers.

7. The computer program product of claim 1, further comprising:
   determining whether migrating the low priority extent produces enough reserve space on the first storage tier.

8. The computer program product of claim 1, wherein prioritizing the plurality of first tier extents on the first storage tier is based on an access time of an extent.

9. The computer program product of claim 1, wherein prioritizing the plurality of first tier extents on the first storage tier is based on a frequency of access for an extent.

10. The computer program product of claim 9, wherein the frequency of access includes a real-time value.

* * * * *